United States Patent [19]

Baumann

[11] 4,345,850

[45] Aug. 24, 1982

[54] CLAMP-ON QUICK DISCONNECT ROTARY VALVE LINKAGE ARRANGEMENT

[76] Inventor: Hans D. Baumann, P.O. Box 471, Rye, N.H. 03870

[21] Appl. No.: 275,978

[22] Filed: Jun. 22, 1981

[51] Int. Cl.³ .......................... B25G 3/20; F16B 2/14
[52] U.S. Cl. .................................... 403/373; 403/350
[58] Field of Search ............ 403/373, 374, DIG. 350; 292/306, 349, 178

[56] References Cited

U.S. PATENT DOCUMENTS

| | | | |
|---|---|---|---|
| 350,460 | 10/1886 | Leslie | 292/306 |
| 2,839,319 | 6/1958 | Hobart | 292/306 X |
| 2,856,214 | 10/1958 | Schrimshaw | 403/373 |

FOREIGN PATENT DOCUMENTS 1519583  8/1978  United Kingdom ................ 403/373

Primary Examiner—Andrew V. Kundrat

[57] ABSTRACT

Two-piece rotary valve linkage loosely slidable arranged on a square shaft configuration and capable of tilting towards each other over a pre-arranged angular distance for the purpose of solidly engaging said square shaft and thereby being capable of transmitting significant tortional loads to said shaft without lost motion or displacement in the direction of the shaft axis.

4 Claims, 4 Drawing Figures

CLAMP-ON QUICK DISCONNECT ROTARY VALVE LINKAGE ARRANGEMENT

BACKGROUND OF THE INVENTION

Most rotary valves, such as butterfly valves, ball valves, and plug valves, require interconnecting elements between their automatic actuating devices having linear shaft movements and the rotating shafts of the valve itself.

Such interconnecting elements consist generally of a linkage having a primary opening which engages the valve shaft and a secondary opening, at some radial distance from the valve shaft center, to interconnect with a ball joint which in turn connects with a reciprocating spindle or actuator stem. The joint between this lever and the rotary valve shaft has to be strong to transmit substantial tortional forces during operation of the valve. In case of modulating control valves, there is an additional need to have this joint be free of any loose play or backlash. Any lost motion being highly detrimental to the positioning accuracy of the control system. Simple lever with a Woodruff key, engaging milled slots in either shaft and linkage, might be sufficient for transmission of torque for on/off valves. However, such method is highly unsatisfactory in case of modulating control valves.

Present state of the art devices utilize mechanisms to overcome these problems with precision milled and broached multi-splined shaft configurations. These levers, in addition, are split at least partially and clamped by means of suitable fasteners to prevent additional slippage. This method is reasonably satisfactory. However, it poses major disadvantages: First, the multi-spline machining operation is very complex and expensive due to the required tight tolerances and secondly, the disassembly of such a lever system after prolonged service in a corrosive atmosphere is very difficult. Thirdly, the angular alignment is very important and the availability of 30 or 40 spline positions tends to encourage wrongful angular alignment during assembly.

My invention overcomes all these disadvantages by providing a pair of identical linkages made from simple cast pieces without need of machining, which will slide loosely onto a square shaft configuration and which, by simply tilting towards each other, will tightly engage the shaft without backlash. The loosening of a simple fastener will restore the former loose engagement and will enable the levers to slide off the shaft even after prolonged corrosive service. Use of a square shaft configuration eliminates the possibility of angular error during assembly.

The object of this invention is to provide a very inexpensive simple, and reliable means of torque transmission for rotary control valves.

These and other advantages may be more readily understood when viewed in light of the following drawings:

BRIEF DESCRIPTION OF DRAWINGS

Referring to FIG. 1, my invention consists of a pair of identical levers 1 having square hub sections 4 and a square opening 3. An upper elongated arm portion 6 is slightly bent away from the perpendicular axis of bore 3 and has one or more cross holes 7. Hub 4, furthermore, shows a semi-tapered surface 5. In the normal mounting arrangement, an identical pair of levers 1 are mounted into a rotary valve shaft 2 whose extended portion is milled in the form of a square cross section 3a. The dimension of the square shaft portion is somewhat less than that of the lever bore 3 so that clearances 8 and 8a exist to enable free sliding of levers 1 in the direction of the valve axis. In the actual use of the invented lever arrangement, a ball joint 10, or similar lifting devices, will be added between the two arms 6 and clamped between the same after placement and tightening of a bolt 9 and hex nut 10, as shown in FIG. 3. During the process of moving arms 6 towards each other, both hubs 4 will pivot around tapered surfaces 5, forcing corners 19 of bore 3 to tightly engage with shaft surface 3a. The amount of clearance 8 is such that this tight engagement takes place before arms 6 firmly contact surfaces 20 of the ball joint 10.

A simple disengagement of bolt 9 will restore the former clearances 8 and 8a and allow a very easy sliding off of the linkage arragement from shaft 2 even after prolonged service life.

Figure 1:
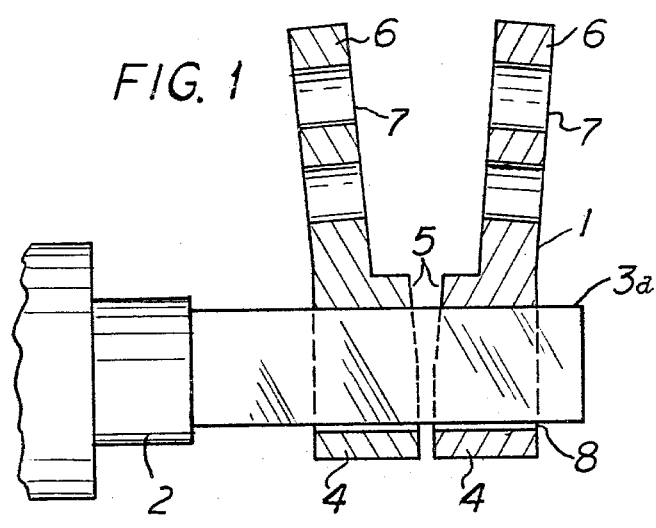
FIG. 1 shows a central cross sectional view of my invented lever arrangement engaging a typical rotary valve shaft.
Figure 2:
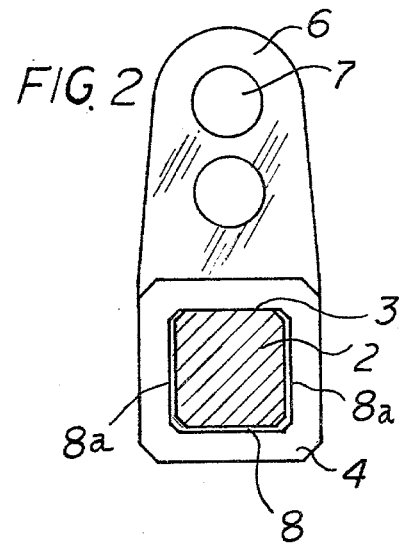
FIG. 2 is a side view of the arrangement seen in FIG. 1.
Figure 3:
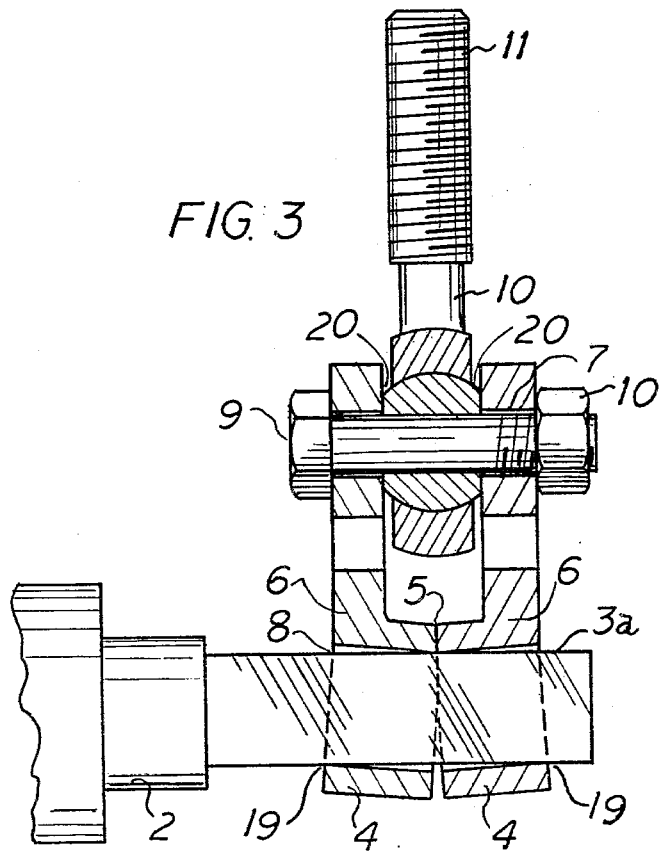
FIG. 3 shows the invented lever arrangement in the installed position additionally engaging a ball joint.
Figure 4:
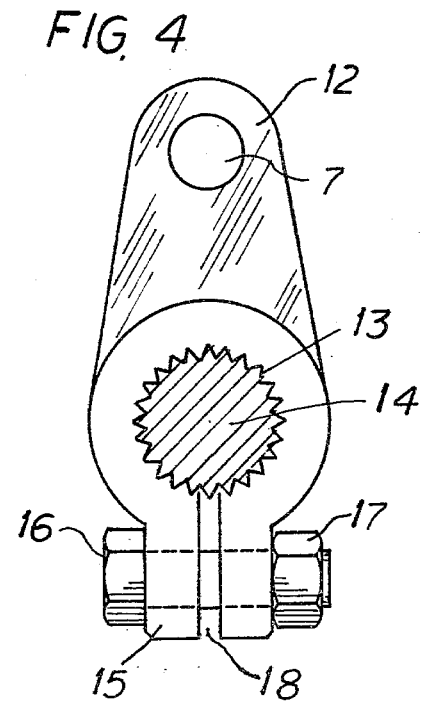
FIG. 4 shows a multi-splined lever arrangement, representative of a present state of the art device.

In contrast, presently used linkages, such as illustrated in FIG. 4, employ a number of fine serrations milled onto the shaft 14 to engage a precision broached similar bore in lever 12. While this precision fit, which is rather costly to produce, does insure transmission of torque and a minimum radial clearance, it will not prevent accidental sliding in the direction of the shaft axis. Additional clamping, therefore, has to be provided by milling a slot 18 into the lower half of lever 12 which enables a circumferential clamping action of the lever by means of bolt 16 and nut 17. The provision of typically 20 to 40 small splines can lead to errors in angular alignment during the assembly process. For example, accidental misplacement by one spline would shift the lever position by 12° in respect to the true shaft axis.

The disengagement of such precision machined spline surfaces after prolonged service is very difficult and can greatly aggravate maintenance of such rotary valves.

Numerous modifications can be made in my invention such as choosing a hexagonal shaft cross section, or a semi-circular cross section, for example, without limiting the scope of the following claims:

I claim:

1. A rotary valve linkage arrangement consisting of a pair of levers having a central bore with at least two parallel flat surfaces engaging therewith a valve shaft having a similar but slightly smaller cross sectional profile than that of said lever bore, said levers further having each an extended arm portion encompassing therein one or more bores placed at some radial distance from the shaft axis and capable of engaging suitable fastening means, each of said levers having additional hub portions extending in width beyond the thickness of said extended arm portions and terminating in contact surfaces facing each other, said arms being urged towards each other by suitable fastening means to cause a tilting action of both levers around the contact surfaces of the extending hub portions facing each other and thereby causing tight engagement between the parallel surfaces of said shaft and lever bores.

2. Rotary valve linkage arrangement of claim 1, wherein each of said extended arm portions is angularly displaced from an axis perpendicular to that of the central bore through each of said levers.

3. Rotary valve linkage of claim 2, wherein a part of the terminating hub portion extending from each lever has an inclined surface running essentially parallel to that of the arm portion.

4. Rotary valve linkage of claim 1, wherein the central bore through each of said levers has a rectangular cross section.

* * * * *